United States Patent
Karri et al.

(10) Patent No.: US 12,085,714 B2
(45) Date of Patent: Sep. 10, 2024

(54) DEVICE MANAGEMENT IN A SMART ENVIRONMENT

(71) Applicant: International Business Machines Corporation, Armonk, NY (US)

(72) Inventors: Venkata Vara Prasad Karri, Visakhapatnam (IN); Partho Ghosh, Kolkata (IN); Saraswathi Sailaja Perumalla, Visakhapatnam (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/556,837

(22) Filed: Dec. 20, 2021

(65) Prior Publication Data
US 2023/0194864 A1    Jun. 22, 2023

(51) Int. Cl.
  *G02B 27/01* (2006.01)
  *G06F 3/01* (2006.01)
  *G06T 19/00* (2011.01)

(52) U.S. Cl.
  CPC ............ *G02B 27/017* (2013.01); *G06F 3/011* (2013.01); *G06T 19/006* (2013.01);
  (Continued)

(58) Field of Classification Search
  CPC ............ G02B 27/017; G02B 2027/014; G02B 2027/0141; G02B 2027/0167;
  (Continued)

(56) References Cited

U.S. PATENT DOCUMENTS

2015/0277119 A1* 10/2015 Wong .................... G06F 3/013
                                                                345/633
2018/0004286 A1*  1/2018 Chen .................... G06F 3/012
(Continued)

FOREIGN PATENT DOCUMENTS

CN          106919254 A     7/2017
CN          112315100 A     2/2021
(Continued)

OTHER PUBLICATIONS

Leland, Krista. "Improving Worker Safety Through Industrial IoT." Published Apr. 1, 2020 by Insight. 7 pages. https://www.insight.com/en_US/content-and-resources/2020/improving-worker-safety-through-industrial-iot.html.
(Continued)

*Primary Examiner* — Adam R. Giesy
(74) *Attorney, Agent, or Firm* — Steven M. Bouknight

(57) ABSTRACT

A processor may receive environment data associated with a smart environment having one or more intelligent environment device. A processor may analyze the environment data and intelligent environment device information, wherein the intelligent environment device information is associated with the intelligent environment device. A processor may generate a simulation based, at least in part on, the environment data and the intelligent environment data. A processor may identify one or more hazards in the smart environment from the simulation, wherein the one or more hazards are associated with the one or more intelligent environment devices.

19 Claims, 5 Drawing Sheets

(52) U.S. Cl.
CPC ............... *G02B 2027/014* (2013.01); *G02B 2027/0141* (2013.01); *G02B 2027/0167* (2013.01); *G06T 19/00* (2013.01); *G06T 2200/04* (2013.01)

(58) Field of Classification Search
CPC ....... G06F 3/011; G06T 19/006; G06T 19/00; G06T 2200/04
See application file for complete search history.

(56) References Cited

U.S. PATENT DOCUMENTS

| | | |
|---|---|---|
| 2020/0124845 A1 | 4/2020 | Smith |
| 2022/0188545 A1* | 6/2022 | Nagar ............... G06F 3/017 |

FOREIGN PATENT DOCUMENTS

| | | |
|---|---|---|
| KR | 20190098109 A | 8/2019 |
| WO | 2018103567 A1 | 6/2018 |

OTHER PUBLICATIONS

Anonymous. "Knock-Knock User Alert System for Virtual and Augmented Reality." Published May 25, 2018 by IP.com. 3 pages. https://priorart.ip.com/IPCOM/000254029.

Boyles, Ryan. "Ensuring worker safety for the technician of the future." Published Sep. 20, 2019 by IBM. 8 pages. https://www.ibm.com/blogs/internet-of-things/iot-nsc-worker-safety/.

Mell, et al., "The NIST Definition of Cloud Computing," Recommendations of the National Institute of Standards and Technology, U.S. Department of Commerce, Special Publication 800-145, Sep. 2011, 7 pgs.

Theis, et al., "Considering ergonomic aspects of head-mounted displays for applications in industrial manufacturing." Published Jul. 2013 by Research Gate. 11 pages. In Proceedings of the 4th international conference on Digital Human Modeling and Applications in Health, Safety, Ergonomics, and Risk Management: human body modeling and ergonomics—vol. Part II. DOI: 10.1007/978-3-642-39182-8_34.

* cited by examiner

DEVICE MANAGEMENT IN A SMART ENVIRONMENT

BACKGROUND

The present disclosure relates generally to smart environments, and more specifically to smart environments utilizing virtual reality (VR) and/or augmented reality (AR) devices.

The development of VR related technology has changed how people interact with their environment. As this technology has grown in popularity, so too has demand to make VR more available to solve daily problems. While many VR applications are associated with entertainment (e.g., video games), VR technology has been adopted across industries to address various business needs.

SUMMARY

Embodiments of the present disclosure include a method, computer program product, and system for managing devices in a smart environment. A processor may receive environment data associated with a smart environment having at least one intelligent environment device. A processor may analyze the environment data and intelligent environment device information. The intelligent environment device information is associated with the one or more intelligent environment devices. A processor may generate a simulation based, at least in part on, the environment data and the intelligent environment data. A processor may identify one or more hazards in the smart environment from the simulation, wherein the one or more hazards are associated with the one or more intelligent environment devices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
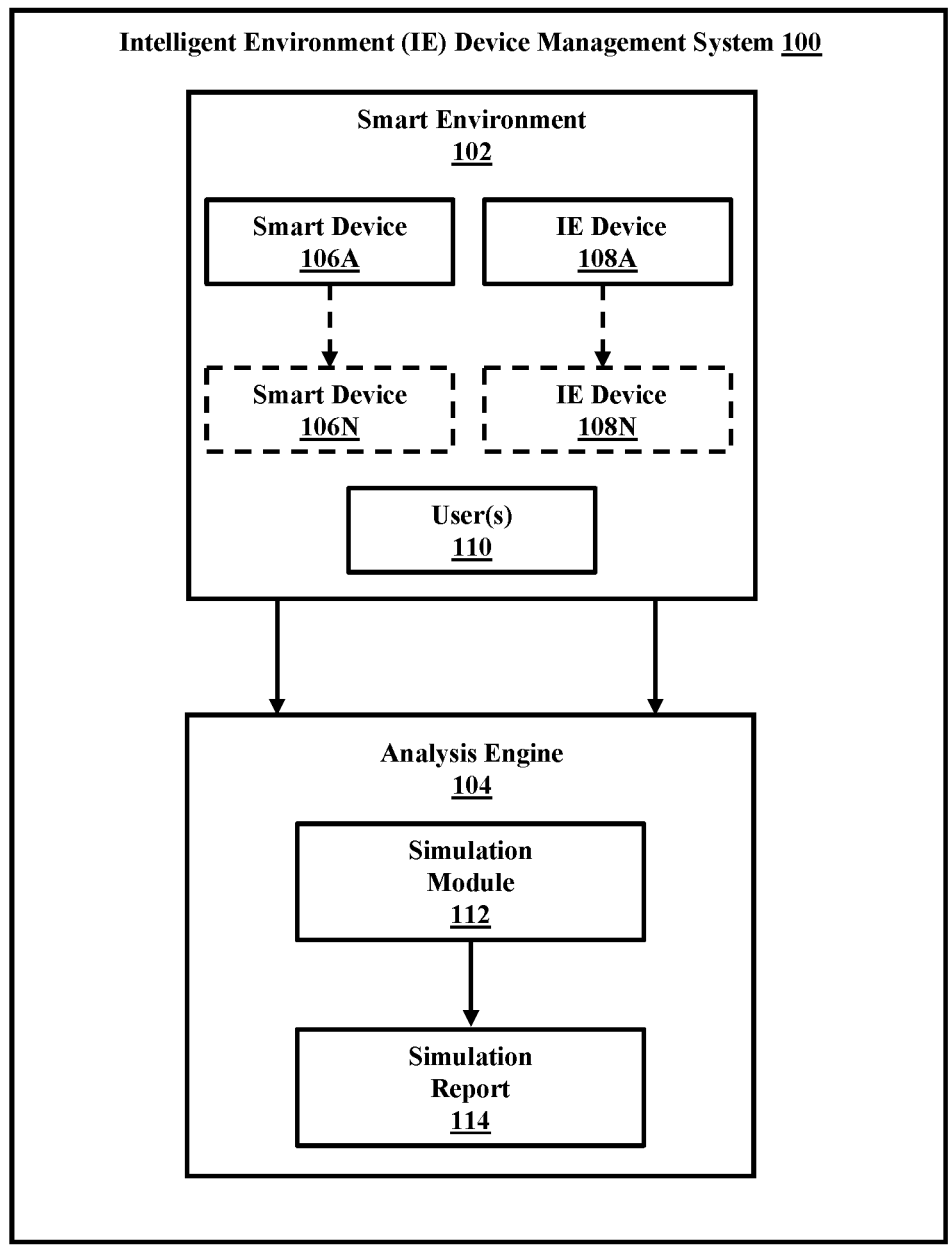
FIG. 1 depicts a block diagram of an embodiment of an intelligent environment (IE) management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to smart environments, and more specifically smart environments utilizing virtual reality (VR) and/or augmented reality (AR) devices, such AR/VR devices utilized in a workplace. While the present disclosure is not necessarily limited to such applications, various aspects of the disclosure may be appreciated through a discussion of various examples using this context.

VR and AR devices (e.g., VR/AR headsets) have provided various industries (e.g., manufacturing and entertainment industries) with solutions to their problems and new ways user can interact with their surroundings, such devices are not without their potential drawbacks. User safety is one of the most important factors in any work area, be it in an industrial factory floor or an entertainment setting. The addition of VR/AR devices (e.g., intelligent environment devices) into such environments can result in safety issues (e.g., one or more hazards) to users. Because users may be interacting with the VR/AR environment (e.g., intelligent environment), users may not be aware of potential safety hazards and may be unable to avoid such hazards. Accordingly, provided herein are solutions for simulating a user's interaction with VR/AR devices. These simulations may be based, at least in part on the type of headset, type of VR/AR kit, VR/AR content, and duration of user interaction. The simulations of the user's interaction may be used to identify how the VR/AR devices may affect the user (e.g., one or more hazards) and generate recommendations (e.g., in a recommendation report) to mitigate the negative effects of VR/AR, devices or other similarly configured devices, on the user.

Before turning to the FIGS. it is noted that the benefits/novelties and intricacies of the proposed solution are that:

An IE device management system (e.g., Internet of Things (IoT) and artificial intelligence (AI) enabled system) may analyze, using one or more simulations, the static and dynamic properties of any predicted accidental situation (e.g., one or more hazards) in a smart environment having one or more VR and/or AR devices (e.g., IE devices). Based on the simulations of the accidental situation, the IE device management system may identify what circumstances caused the accidental situation. For example, an accidental situation or hazard may result from a particular activity performed on an industrial shop floor (e.g., smart environment) where IE devices are used, type of IE device used (e.g., headset) during those accidental situations. The IE device management system may use environment data (e.g., historical logbooks, worksheets) to perform such analyses. IE device management system may be configured to categorize accidental situations/hazards and generate hazard mapping of the smart environment.

The IE device management system may be configured to identify types of precautions the users should have taken to avoid the accidental situations (e.g., users should have worn personal protective equipment such as, helmet, gloves, goggles, etc.). Using this information (e.g., environment data) IE device management system may identify the correct IE device (e.g., VR/AR headset, tool kit, etc.) that may be used for the identified accidental situation. In some embodiments, the IE device management system may identify the correct IE device for a particular user in a more personalized manner.

The IE device management system can identify various user experience by analyzing environment data (e.g., data/information gather from feedback forms, voice assistant logs, wearable feeds, IE kits, and structured and unstructured data associated with the smart environment). The user experience may be classified based on the type of accidental situation or hazard reported with respect to a particular IE device. For example, the hazard may be reported with respect to a particular IE headset alone, an IE chair (e.g., VR chair) alone, or both the IE headset and IE chair in combination.

The IE device management system may also identify the hazard associated with a particular user, such as a worker's (e.g., user) discomfort associated with wearing an IE headset (e.g., IE device) on a factory floor based on the number of times the worker adjusts the IE headset (e.g., takes the IE headset on and off). The IE device management system may generate a weightage associated with the accidental situation or hazard to indicate whether the IE device should be updated or exchanged for a different IE device.

The IE device management system may validate, using historical environment data (e.g., user experience report, accidental log, etc.) to see if the weightage generated for a particular accidental situation or hazard and IE device usage (e.g., IE headset usage) is appropriate or not (e.g., causes a hazard). The IE device management system may also use this analysis to determine whether the cause of the hazard is a result of the accidental situation being a new situation (or new to the user) in the smart environment or whether the user of the IE device may require additional training to avoid the accidental situation or hazard.

By analyzing the properties and specifications (e.g., environment data) of the VR headset and VR chair (e.g., IE devices), the IE device management system can consider the above derived outcomes and recommend whether a single IE device alone or the combination of IE devices is sufficient for a specific user (e.g., user type), particular IE content, or particular IE user experience duration.

The IE device management system may be configured to receive user input from users who, due to a particular reason (e.g., medical history), are unable to interact with one or more IE devices or IE content type (e.g., flashing lights). In these embodiments, the IE device management system may be configured to receive input (e.g., environment data) from smart device logs (e.g., wearable devices). The IE device management system may be configured to use this input to control the IE device functionality (e.g., abnormal movement of a VR chair) by auto masking the IE content associated with the input, that may negatively affect the user. For example, the IE device management system may control a VR chair's functionality associated with abnormal movement by auto masking the VR content responsible for the abnormal movement.

Referring now to FIG. 1, illustrated is a block diagram of an example IE device management system 100, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, IE device management system 100 may include smart environment 102, and analysis engine 104. IE device management system 100 may be configured to collect/receive environment data associated with a smart environment 102. Smart environment 102 may refer to any space or area, such as a workspace (e.g., manufacturing workspace) where one or more IE devices 108A-N (depicted as ID devices 108A-108N) are utilized. IE devices 108A-N may include any device that may be configured to display augmented reality (AR) and/or virtual reality (VR) environments. IE devices 108A-N may include, but are not limited to, AR/VR headsets, AR/VR chairs, and AR/VR kits. In embodiments, environment data may be collected/received from one or more smart device 106A-N (e.g., depicted as smart devices 106A-106N) configured in smart environment 102. One or more smart devices 106A-N may include IoT devices, sensors, and any other similarly configured smart device. While in some embodiments, one or more smart devices 106A-N may be independently and separately configured from IE devices 108, in other embodiments, the one or more smart devices 106A-N may be configured within or as a component of IE device 108A-N. In embodiments, environment data may include, but is not limited to, information such as IE device information, environment component information, user information, and/or any other information that may be associated with the environment.

In embodiments, IE device information may include any information associated with IE device 108A-N configured within the smart environment 102, such as the type of headset, type of VR kit, VR content, duration of content, and how user 110 may be interacting with the smart environment 102 while using one or more IE devices 108. In embodiments, environment component information may include information such as, data associated equipment/machinery (e.g., types of rotation/motion component of the machinery, speed of rotation, height of movement etc.) or other objects in smart environment 102. In some embodiments, each environment component (e.g., machinery or machine part) may be uniquely identified using a unique key. Environment component information may also include data associated with the relative positions of the environment components within smart environment 102, the relative position of the environmental components to user 110 located within smart environment 102, and particularly the relative position of the equipment to IE devices currently utilized. This information may also include what environment components may be static or dynamic (e.g., stationary or having a rotating, linear, or harmonic motion).

In embodiments, IE device management system 100 may be configured to store historical environment data in a historical repository. The historical repository may also include information/data associated with logbooks, worksheets and any other type of documentation (e.g., user experiences gathered from feedback forms (e.g., IE device 108A-N creates discomfort for user 110 during use), voice assistant logs (e.g., questions requested by one or more users 110). IE device management system 100 may use this environment data to predict possible hazards (e.g., accidental situations) associated with one or more IE devices 108. A hazard or accidental situation may arise in a variety of settings including, but is not limited to, user 110 performing activities associated with user 110's job role, user 110's interaction with various machines or equipment, or user 110 is performing new activities outside their previous job role.

In embodiments, IE device management system 100 may also be configured to receive (e.g., via one or more smart devices 106A-N) IE device information. IE device information is data associated with one or more IE devices 108A-N. IE device information may include, but is not limited to, properties and specifications of the one or more IE devices 108, such as if the type of headset used offers a VR and/or AR intelligent environment, the shape of one or more IE devices 108, dimensions of IE device 108A-N or the various ergonomic positions associated with a VR chair.

In embodiments, IE device management system 100 may be configured to analyze environment data and IE device information associated with the one or more IE devices 108 of smart environment 102, using analysis engine 104. Analysis engine 104 may be configured with AI and machine learning capabilities to perform various analyses, such as those contemplated herein. In embodiments, analysis engine 104 may be configured to analyze environment data and historical using artificial intelligence and machine learning to identify the type of activities user 110 (e.g., workers) is engaging in, in the smart environment 102 (e.g., workspace). In some embodiments, analysis engine 104 may identify if any hazard has occurred or had the potential to occur and record the associated environment data. Information and result data generated by analysis module 104 may be considered environment data and stored in the historical repository.

In embodiments, analysis engine 104 may include simulation module 112. Simulation module 112 may be configured to analyze environment data and historical environment data using artificial intelligence (AI) and machine learning to generate one or more simulations associated with one or more users 110 and IE devices 108A-N in smart environment 102. In some embodiments, a processor may also analyze IE device information associated with one or more IE devices 108A-N used in the smart environment 102 to improve accuracy of the simulations.

In embodiments, simulation module 112 may be configured to identify particular hazards, such as those associated with the one or more IE devices 108 in the smart environment 102. In embodiments, the simulations generated by simulation module 112 may be used to categorize and map possible hazards associated with one or more IE devices 108 within smart environment 102. Using simulations generated by simulation module 112, IE device management system 100 may be configured to predict the type of precautions user 110 could have taken to prevent a hazard or accidental situation (e.g., wear helmet, gloves, aprons, eyeglasses, or any other personal protective equipment that may be appropriate). In some embodiments, IE device management system 100 may display the predicted precaution (e.g., use of personal protective equipment, additional training, or change in VR/AR headset/tool kit) to user 110 in an IE (E.g., VR or AR environment) to enable user 110 to take corrective actions to avoid the hazard. For example, IE device management system 100 may personalize the intelligent environment for user 110 using IE device 108A-N in smart environment 102 to display how the predicted hazard may apply to user 110 as well as any type of ameliorative action user 110 may perform to mitigate or eliminate the potential of the hazard occurring. In some embodiments, the predictions of one or more hazards may be directly associated with the particular IE device 108A-N user 110 may regularly use in smart environment 102 (e.g., the VR headset is too small for user 110).

In some embodiments, simulation module 112 may be configured to validate one or more historical events associated with historical environment data, such as that stored in the historical repository. For example, IE device management system 100 may configure simulation module 112 to analyze historical environment data using AI and machine learning techniques to determine whether a previous occurring event in smart environment 102 (e.g., user 110 slipping on the floor) was a result of a hazard that may occur again in the future or if the event was the result of a unique set of circumstances that are unlikely to occur again.

In embodiments where the event is identified as a hazard, IE device management system 100 may be configured to generate a weightage associated with a particular hazard. The weightage may be associated with the severity of the identified hazard. While a hazard with a high weightage may indicate that one or more actions should be taken to mitigate or reduce the effect of the hazard, a hazard with a low weightage may indicate no action is required (e.g., the identified hazard does not negatively affect user 110). In an example embodiment where a weightage indicates one or more actions should be taken to mitigate the hazard, IE device management system 100 may indicate that IE device 108A-N should be updated (e.g., provide a new VR headset in a larger size) and/or if user 110 should be provided with additional training to mitigate or eliminate the hazard.

In embodiments, IE device management system 100 may receive environment data associated with IE device 108A-N movement (e.g., VR chair) from one or more smart devices 106A-N (e.g., IoT sensor feeds). In some embodiments, user 110 may optionally provide IE device management system 100 any health related information that may cause a hazard to user 110 while interacting with the IE device and environment. In such embodiments, IE device management system 100 may be configured to analyze (e.g., using analysis engine 104) any IE related content (e.g., AR and/or VR content) that may have movement or effects that may affect user 110's related health hazard. For example, analysis engine 104 may be configured to identify any rotations and/or angular displacements IE devices 108. For example, IE device management system 100 analyze the VR environment of associated with training for user 110 using a VR chair. In this example, IE device management system 100 may identify any movements or displacements associated with the VR training that may result in a health related hazard to a user, such as sudden movements or movements resulting in user 110 shifting 90 degrees.

In some embodiments, IE device management system 100 may be configured to identify these movements using smart devices 106A-N configured on user 110 such as wearable IoT devices. This information may be stored in a log. In some embodiments, IE device management system 100 may analyze the IE content before user 110 interacts or observes the content using IE device 108A-N. In such embodiments, IE device management system 100 (e.g., using analysis engine 104) may preemptively identify possible IE content associated with particular movements (e.g., rotation and angular displacement of a VR/AR chair). Once identified, IE device management system 100 may remove or automatically mask the IE content (e.g., VR/AR content associated with rotation direction, types of rotation/motion, speed of rotation, height of movement etc.) responsible for those movement. By removing or automatically masking the IE content, IE device management system 100 mitigates or eliminates the hazard associated with user 110's health.

In some embodiments, IE device management system 100 may generate simulation report 116. Simulation report 116 may include any data/information resulting from any analyses as contemplated herein from analysis engine 104 and/or simulation module 112. In one example embodiment, simulation report 116 may include one or more simulations to predict one or more hazard, such as hazards associated with IE devices 108A-N, that may affect user 110. For example, simulation report 114 may include a recommendation indicating that the IE device headset user 110 is currently using is too small (e.g., hazard) and uncomfortable for user 110 to continue to use (e.g., based on the weightage associated with discomfort). In some embodiments, simulation report 114 may include one or more recommendations regarding how the hazard may be addressed. For example, the one or more recommendations may include how user 110's headset should be updated or alternated for another IE device in order to reduce or eliminate the associated hazard (e.g., uncomfortable IE device).

Figure 2:
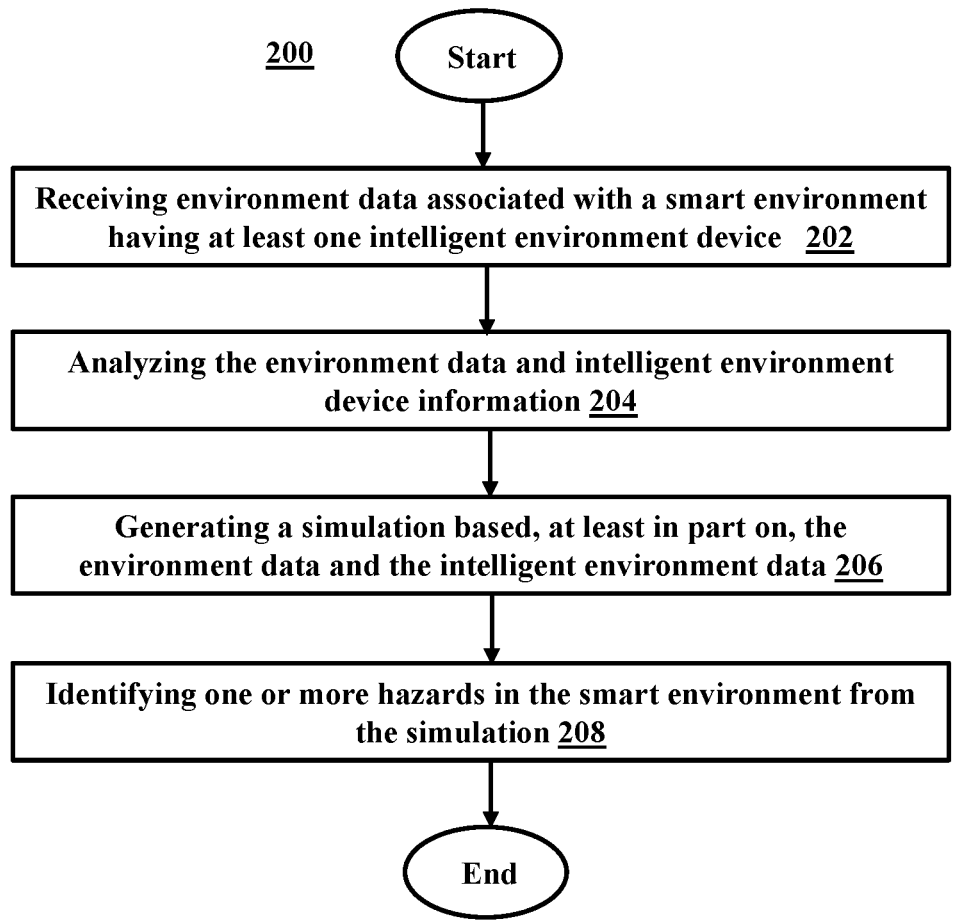
FIG. 2 illustrates a flowchart of a method for managing IE devices in a smart environment, in accordance with embodiments of the present disclosure.

Referring now to FIG. 2, a flowchart illustrating an example method 200 for managing one or more devices (e.g., IE devices) in a smart environment, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive environment data associated with a smart environment having at least one IE device. In some embodiments, the method 200 proceeds to operation 204.

At operation 204, a processor may analyze the environment data and IE device information. In some embodiments, the IE device information may be associated with the one or more IE devices. In some embodiments, the method 200 proceeds to operation 206.

At operation 206, a processor may generate a simulation based, at least in part, on the smart environment data and the IE device information. In some embodiments, the method 200 proceeds to operation 208.

At operation 208, a processor may identify one or more hazards in the smart environment from the simulation. In some embodiments, the one or more hazards may be associated with the one or more IE devices. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
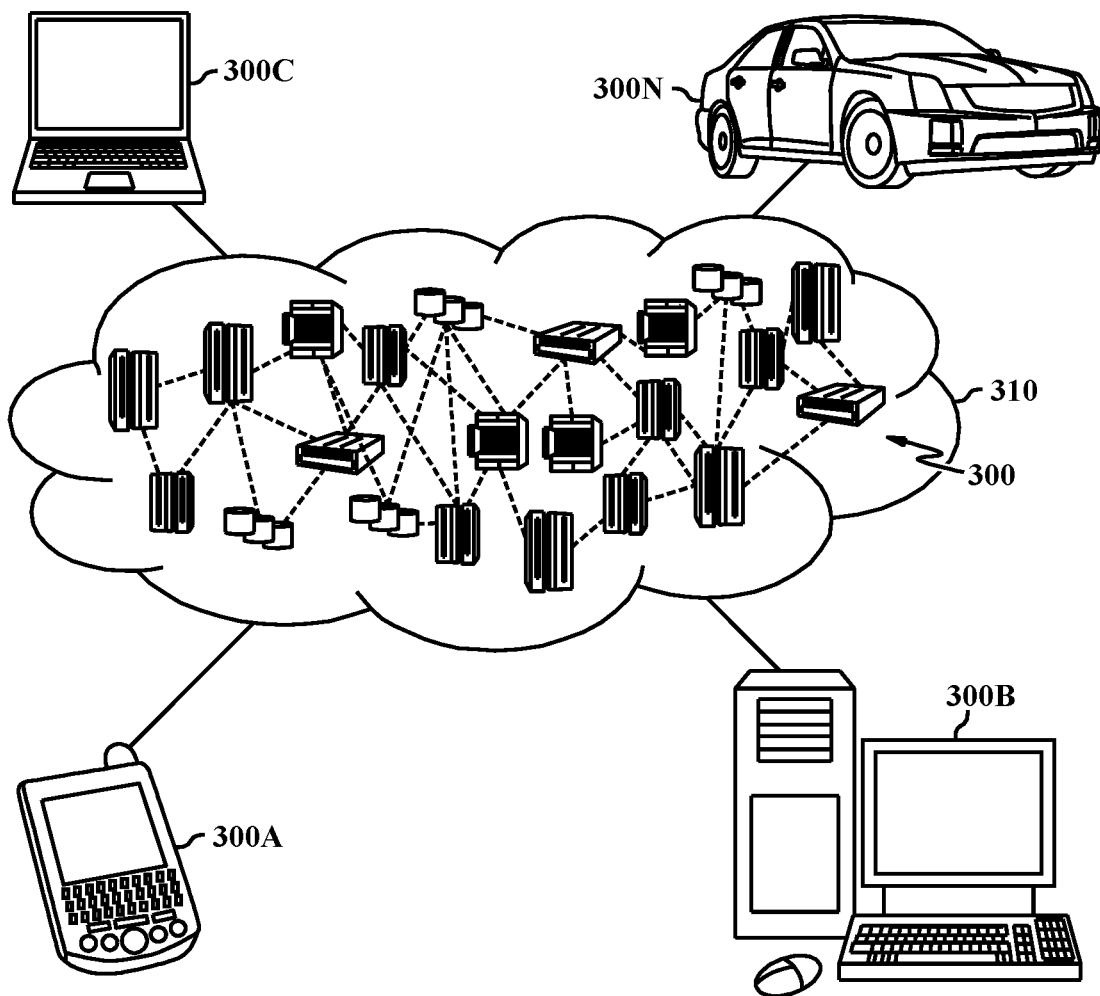
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
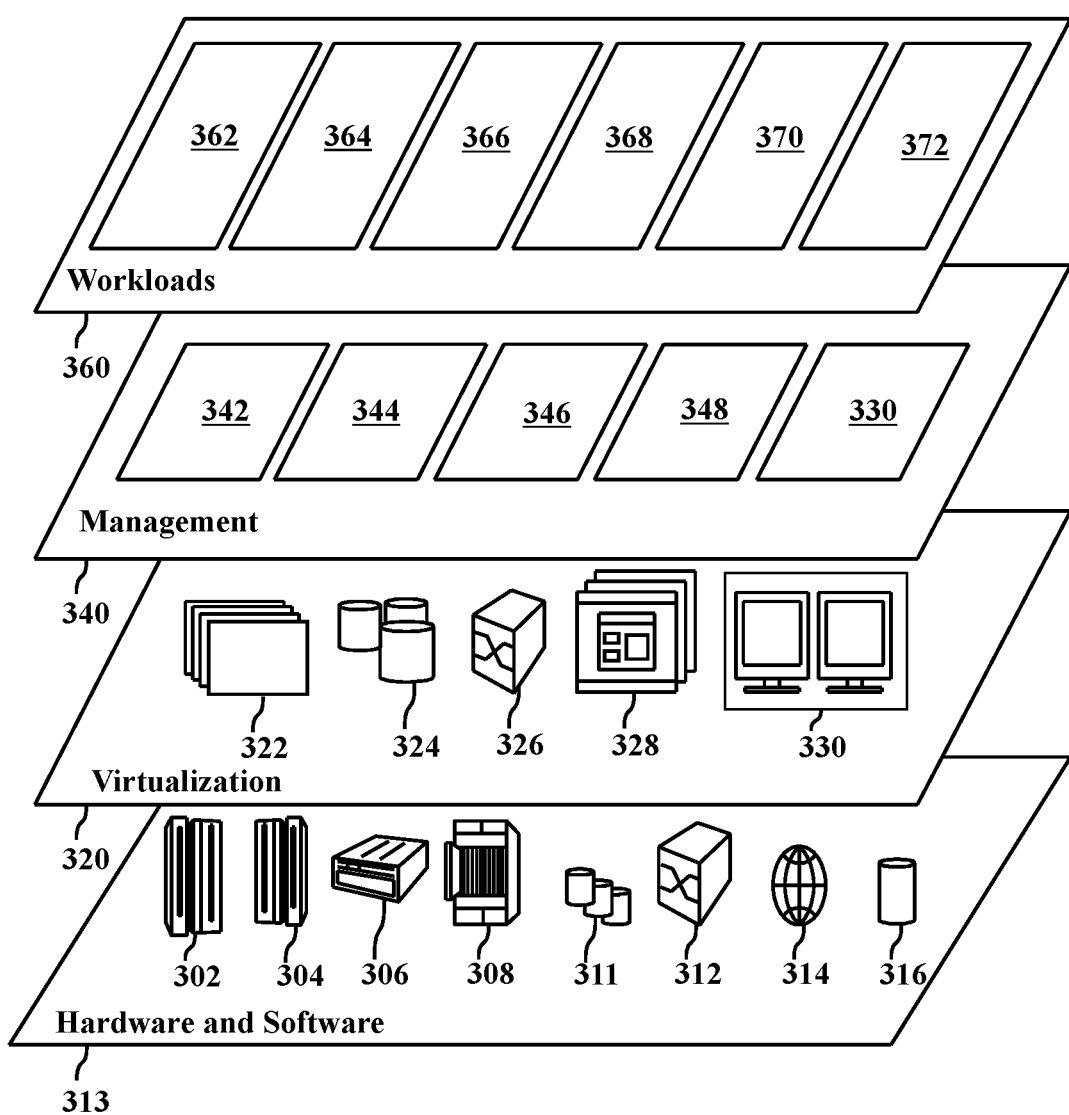
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and IE device managing 372.

Figure 4:
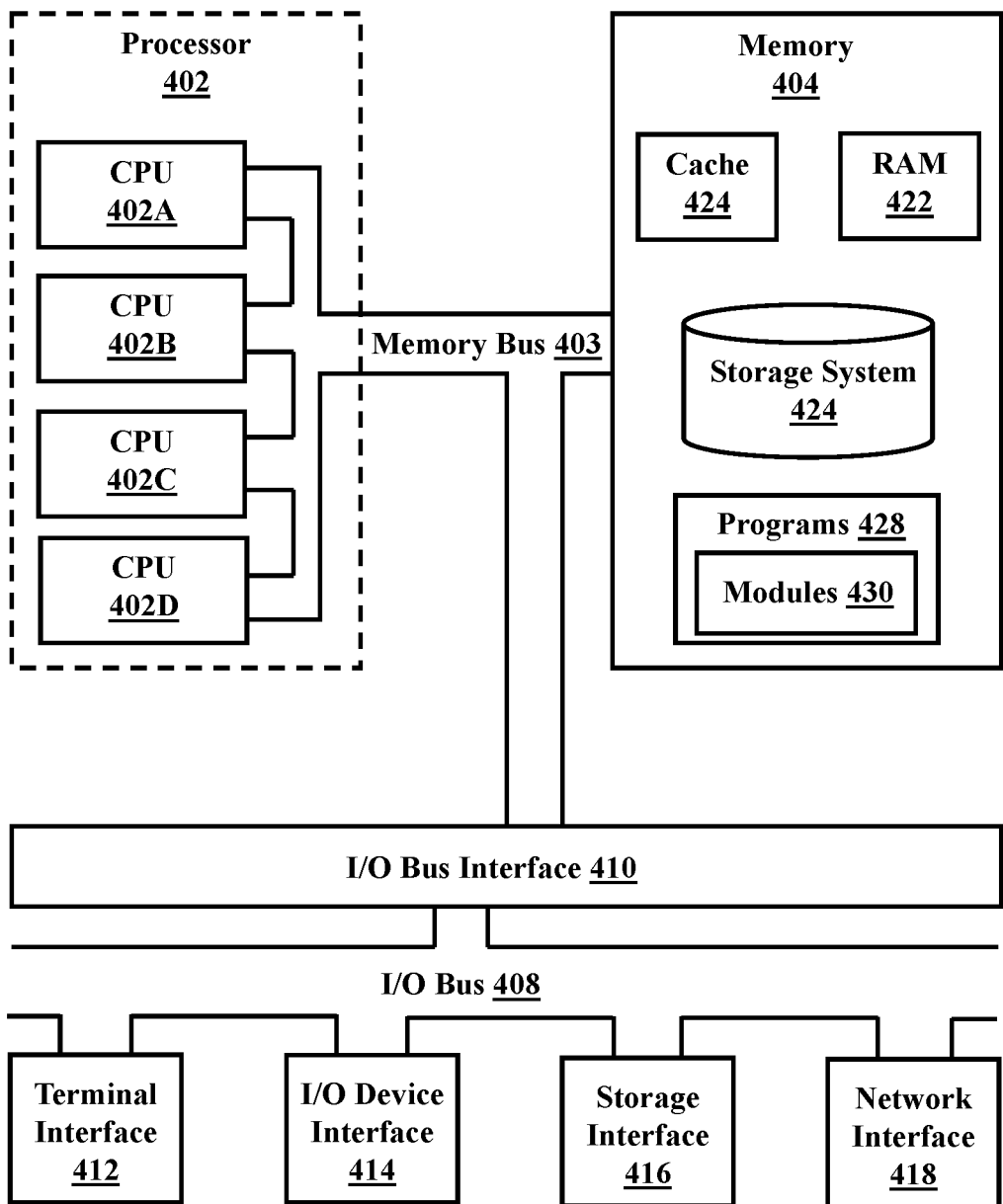
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   receiving, by a processor, environment data associated with a smart environment having at least one intelligent environment (IE) device;
   analyzing the environment data and IE device information, wherein the IE device information is associated with the one or more IE devices;
   generating a simulation based, at least in part, on the smart environment data and the IE device information;
   identifying, based on the simulation, one or more hazards in the smart environment, wherein the one or more hazards include a user having a negative interaction;
   displaying, in an intelligent environment, the one or more hazards and one or more mitigating factors associated with the one or more IE devices, wherein the one or more mitigating factors visually indicate one or more actions associated with reducing a likelihood of occurrence of at least one hazard of the one or more hazards;
   determining, based on analyzing the IE device information, the user is having the negative interaction associated with a particular IE device of the one or more IE devices; and
   recommending to the user, via the intelligent environment, an alternative IE device.

2. The computer-implemented method of claim 1, further comprising:
   predicting one or more future hazards in the smart environment from the simulation, wherein the one or more hazards are associated with the one or more IE devices.

3. The computer-implemented method of claim 1, further comprising:
   validating one or more historical events associated with environment data, wherein the validating the one or more historical events is based on the simulation.

4. The computer-implemented method of claim 1, further comprising:
   generating a simulation report, wherein the simulation report includes one or more recommendations.

5. The computer-implemented method of claim 4, wherein generating a simulation report includes one or more user precautions associated with one or more users in the smart environment.

6. The computer-implemented method of claim 1, further comprising:
   analyzing environment component information associated with the environment data;
   identifying one or more environment components from the environment component information; and
   assigning each of the one or more environment components a unique key.

7. The computer-implemented method of claim 1, further comprising:
   determining, based on analyzing IE device information, the user is having the negative interaction associated with one or more IE content types associated with the intelligent environment generated by the one or more IE devices;
   analyzing a functionality of the one or more IE devices; and
   automatically masking the one or more IE content types associated with the negative interaction in the intelligent environment.

8. The computer-implemented method of claim 1, further comprising:
   analyzing one or more movements associated with the intelligent environment generated by the one or more IE devices;
   identifying a particular movement of the one or more movements, wherein the particular movement is associated with the negative interaction; and
   masking the particular movement within the intelligent environment.

9. A system for managing devices in a smart environment, the system comprising:
   a memory; and
   a processor in communication with the memory, the processor being configured to perform operations comprising:

receiving environment data associated with a smart environment having one or more intelligent environment (IE) device;

analyzing the environment data and IE device information, wherein the IE device information is associated with the one or more IE devices;

generating a simulation based, at least in part, on the smart environment data and the IE device information;

identifying, based on the simulation, one or more hazards in the smart environment, wherein the one or more hazards include a user having a negative interaction;

displaying, in an intelligent environment, the one or more hazards and one or more mitigating factors associated with the one or more IE devices, wherein the one or more mitigating factors visually indicate one or more actions associated with reducing a likelihood of occurrence of at least one hazard of the one or more hazards;

determining, based on analyzing the IE device information, the user is having the negative interaction associated with a particular IE device of the one or more IE devices; and recommending to the user, via the intelligent environment, an alternative IE device.

10. The system of claim 9, further comprising:
predicting one or more future hazards in the smart environment from the simulation, wherein the one or more hazards are associated with the one or more IE devices.

11. The system of claim 9, further comprising:
validating one or more historical events associated with environment data, wherein the validating the one or more historical events is based on the simulation.

12. The system of claim 9, further comprising:
generating a simulation report, wherein the simulation report includes one or more recommendations.

13. The system of claim 12, wherein generating a simulation report includes one or more user precautions associated with one or more users in the smart environment.

14. The system of claim 9, further comprising:
analyzing environment component information associated with the environment data;
identifying one or more environment components from the environment component information; and
assigning each of the one or more environment components a unique key.

15. A computer program product for managing one or more devices in a smart environment comprising a computer readable storage medium having program instructions embodied therewith, the program instructions executable by a processor to cause the processor to perform operations, the operations comprising:

receiving environment data associated with a smart environment having one or more intelligent environment (IE) device;

analyzing the environment data and IE device information, wherein the IE device information is associated with the one or more IE devices;

generating a simulation based, at least in part, on the smart environment data and the IE device information;

identifying, based on the simulation, one or more hazards in the smart environment, wherein the one or more hazards include a user having a negative interaction;

displaying, in an intelligent environment, the one or more hazards and one or more mitigating factors associated with the one or more IE devices, wherein the one or more mitigating factors visually indicate one or more actions associated with reducing a likelihood of occurrence of at least one hazard of the one or more hazards;

determining, based on analyzing the IE device information, the user is having the negative interaction associated with a particular IE device of the one or more IE devices; and recommending to the user, via the intelligent environment, an alternative IE device.

16. The computer program product of claim 15, further comprising:
predicting one or more future hazards in the smart environment from the simulation, wherein the one or more hazards are associated with the one or more IE devices.

17. The computer program product of claim 15, further comprising:
validating one or more historical events associated with environment data, wherein the validating the one or more historical events is based on the simulation.

18. The computer program product of claim 15, further comprising:
generating a simulation report, wherein the simulation report includes one or more recommendations.

19. The computer program product of claim 18, wherein generating a simulation report includes one or more user precautions associated with one or more users in the smart environment.

* * * * *